United States Patent

Hisamune et al.

[11] Patent Number: 5,989,455
[45] Date of Patent: Nov. 23, 1999

[54] ALUMINATE PHOSPHOR, PROCESS FOR PREPARING THE SAME, AND VACUUM ULTRAVIOLET-EXCITED LIGHT EMITTING DEVICE

[75] Inventors: Takayuki Hisamune; Masakazu Nabu, both of Odawara, Japan

[73] Assignee: Kasei Optonix, Ltd., Tokyo, Japan

[21] Appl. No.: 09/147,350

[22] PCT Filed: Jun. 10, 1997

[86] PCT No.: PCT/JP97/01989

§ 371 Date: Dec. 7, 1998

§ 102(e) Date: Dec. 7, 1998

[87] PCT Pub. No.: WO97/47705

PCT Pub. Date: Dec. 18, 1997

[51] Int. Cl.$^6$ .............................. C09K 11/64; H01J 1/62; H01J 61/44

[52] U.S. Cl. .................... 252/301.4 R; 428/640; 313/495; 313/497; 250/483.1

[58] Field of Search ............... 250/483.1; 313/495, 313/497; 252/301.4 R; 428/690

[56] References Cited

U.S. PATENT DOCUMENTS

4,085,351  4/1978  Takahashi et al. ............... 252/301.4 R
5,868,963  2/1999  Thi et al. ........................... 252/301.4 R

FOREIGN PATENT DOCUMENTS

56-147885  11/1981  Japan .

*Primary Examiner*—C. Melissa Koslow
*Attorney, Agent, or Firm*—Oblon, Spivak, McClelland, Maier & Neustadt, P.C.

[57] ABSTRACT

A manganese-activated aluminate phosphor represented by the following compositional formula and a vacuum ultraviolet ray excitation type light-emitting element having this phosphor as a fluorescent layer:

$$(1-a)(bMO \cdot 6Al_2O_3) \cdot a(MMg_{1-c}Mn_cAl_{10}O_{17})$$

wherein M is at least one member of Ba and Sr, and a, b and c are numbers satisfying the conditions of $0.05 \leq a \leq 1.0$, $0.64 \leq b \leq 0.86$, $0.05 \leq c \leq 1.0$ and $0.05 \leq a \times c \leq 0.3$, respectively

3 Claims, 1 Drawing Sheet

ALUMINATE PHOSPHOR, PROCESS FOR PREPARING THE SAME, AND VACUUM ULTRAVIOLET-EXCITED LIGHT EMITTING DEVICE

TECHNICAL FIELD

The present invention relates to a manganese-activated aluminate phosphor which emits a green color with high efficiency under excitation with vacuum ultraviolet rays and a process for its production, as well as a vacuum ultraviolet ray excitation type light-emitting element which employs this phosphor as a fluorescent layer and which emits a green color under excitation with vacuum ultraviolet rays.

BACKGROUND ART

In recent years, developments have been actively carried out for vacuum ultraviolet ray excitation type light-emitting elements in which phosphors are excited by ultraviolet rays radiated by electric discharge of a rare gas, to emit lights. One example thereof is a plasma display panel (hereinafter referred to as "PDP"). PDP is one wherein narrow discharge spaces (hereinafter referred to as "cells") are arranged in a matrix form. Each cell is provided with an electrode, and the inside of each cell is coated with a phosphor. In each cell, a rare gas such as Xe or Xe-Ne is sealed in. When an electric energy is applied from the electrode, discharge of the rare gas takes place in the cell, whereby vacuum ultraviolet rays are radiated, and the phosphor coated in the cell is thereby excited to emit visible lights. By arranging such cells, an image can be displayed by lights emitted from the respective cells. Full color display can be carried out by arranging cells coated with phosphors which emit red, blue and green colors in a matrix form. This is full color PDP.

Full color PDP is practically used in which (Y, Gd)$BO_3$:Eu is used as a red color phosphor, $Zn_2SiO_4$:Mn as a green color phosphor and $BaMgAl_{14}O_{23}$:Eu as a blue color phosphor (separate volume of Nikkei Micro Device Journal, "Flat Panel Display", 1994, published by Nikkei BP Company).

As a green phosphor to be excited with vacuum ultraviolet rays, in addition to the above mentioned $Zn_2SiO_4$:Mn, Mn-activated alkaline earth aluminate phosphors $BaAl_{12}O_{19}$:Mn and $BaMgAl_{14}O_{23}$:Mn, are known as ones capable of emitting lights highly efficiently (e.g. "Phosphor Handbook", compiled by Phosphor Research Society, p. 330–335, published by Ohm Company).

Further, JP-A-52-143987 discloses an ultraviolet ray excitation type light-emitting element employing $Ba_{0.9}Mn_{0.16}Al_2O_3$ or $Ba_{0.3}Mg_{0.6}Mn_{0.1}\cdot 8Al_2O_3$. However, in order to improve the properties of full color PDP, it is desired to further improve the properties, such as emission efficiency, of the phosphor to be used here.

Accordingly, the present invention is intended to provide a phosphor having luminance improved for vacuum ultraviolet ray excitation and a process for its production, as well as vacuum ultraviolet ray excitation type light-emitting element with high luminance.

DISCLOSURE OF THE INVENTION

The present inventors have studied in detail the emission luminance under excitation with vacuum ultraviolet rays of conventional alkaline earth aluminate compositions and phosphors having crystals made of such compositions as host materials activated with manganese. As a result, only when the conventional aluminates are composed of a solid solution comprising an aluminate having a composition of the following compositional formula $MMg_{1-c}Mn_cAl_{10}O_{17}$ and an aluminate having a composition of the following compositional formula $bMO\cdot 6Al_2O_3$ (wherein each M is at least one member selected from Ba and Sr), and an alkaline earth aluminate host material having a certain specific composition wherein the solid solublized ratio of the two is within a certain range, is activated with manganese (Mn), the phosphor exhibits an emission with a particularly high luminance under excitation with vacuum ultraviolet rays, and a vacuum ultraviolet ray excitation type emission element employing this phosphor as a fluorescent layer, exhibits an emission with high efficiency, whereby it has been made possible to solve the above problems.

Namely, the present invention provides the following constructions:

(1) A manganese-activated aluminate phosphor represented by the following compositional formula:

$(1-a)(bMO\cdot 6Al_2O_3)\cdot a(MMg_{1-c}Mn_cAl_{10}O_{17})$ wherein M is at least one member of Ba and Sr, and a, b and c are numbers satisfying the conditions of $0.05 \leq a \leq 1.0$, $0.64 \leq b \leq 0.86$, $0.05 \leq c \leq 1.0$ and $0.05 \leq a \times c \leq 0.3$, respectively.

(2) A vacuum ultraviolet ray excitation type light-emitting element characterized in that it has the manganese-activated aluminate phosphor as defined in the above (1), as a fluorescent layer.

(3) A process for producing a manganese-activated aluminate phosphor characterized by mixing phosphor material compounds comprising an oxide of element M or a compound of element M which is readily convertible at a high temperature to an oxide of element M, $Al_2O_3$ or a compound of Al which is readily convertible at a high temperature to an oxide of element Al, MgO or a compound of element Mg which is readily convertible at a high temperature to an oxide of element Mg, and $MnO_2$ or a compound of element Mg which is readily convertible at a high temperature to an oxide of Mn, stoichiometrically in the proportions represented by the following compositional formula, then adding to the mixture a fluoride as a flux in an amount of 0.1 mol per mol of the phosphor at the maximum, and firing the mixture at a temperature of from 1,200 to 1,600° C.:

$(1-a)(bMO\cdot 6Al_2O_3)\cdot a(MMg_{1-c}Mn_cAl_{10}O_{17})$ wherein M is at least one member of Ba and Sr, and a, b and c are numbers satisfying the conditions of $0.05 \leq a \leq 1.0$, $0.64 \leq b \leq 0.86$, $0.05 \leq c \leq 1.0$ and $0.05 \leq a \times c \leq 0.3$, respectively.

Here, the value a defines the solid solublized ratio of $(MMg_{1-c}Mn_cAl_{10}O_{17})$ and $(bMO\cdot 6Al_2O_3)$ in the phosphor of the present invention. The value a may be changed from 0 to 1, but, as described hereinafter, it is possible to obtain a phosphor having high luminance by adjusting the value a to a level of at least 0.05.

Further, a phosphor having high luminance can be obtained even when the value b is changed within a range of from 0.64 to 0.86. From the viewpoint of the emission luminance, it is particularly preferably within a range of $0.75 \leq b \leq 0.84$.

And, the value c defines the Mn concentration in the composition $(MMg_{1-c}Mn_cAl_{10}O_{17})$, but the Mn concentration is defined by the Mn concentration (a×c) in the entire phosphor. If this value (a×c) is less than 0.05, the concentration of the activator tends to be too low, and the emission luminance of the resulting phosphor tends to be low, and if it exceeds 0.3, concentration quenching is likely to take place, whereby the luminance tends to be low. Accordingly, it is preferred to adjust it within a range of $0.05 \leq (a \times c) \leq 0.3$. It is more preferred to adjust it within a range of $0.1 \leq (a \times c) \leq 0.2$.

The Mn-activated alkaline earth aluminate phosphor of the present invention can be synthesized as follows. As phosphor raw materials, an oxide of element M (element M is Ba and/or Sr) or a compound of element M which can readily be convertible at a high temperature to an oxide, such as a hydroxide or a carbonate of element M, aluminum oxide or an aluminum compound which is readily convertible at a high temperature to an oxide, such as a hydroxide, a nitrate, or a sulfate of aluminum, magnesium oxide or a magnesium compound which is readily convertible at a high temperature to an oxide, such as a hydroxide or a carbonate of magnesium, and manganese oxide or a compound of manganese which is readily convertible at a high temperature to an oxide, such as a carbonate or a halide of manganese, are weighed stoichiometrically in the proportions represented by the following compositional formula, and they are thoroughly mixed:

$(1-a)(bMO \cdot 6Al_2O_3) \cdot a(MMg_{1-c}Mn_cAl_{10}O_{17})$ wherein M is at least one member of Ba and Sr, and a, b and c are numbers satisfying the conditions of $0.05 \leq a \leq 1.0$, $0.64 \leq b \leq 0.86$, $0.05 \leq c \leq 1.0$ and $0.05 \leq a \times c \leq 0.3$, respectively.

Then, to this mixture, a flux made of a fluoride such as barium fluoride, aluminum fluoride or magnesium fluoride is blended, and the raw material mixture is thoroughly mixed. The amount of the flux is at the maximum 0.1 mol, preferably within a range of from 0.002 to 0.030 mol, per mol of the phosphor, and the mixture is packed in a heat resistant crucible and fired at least once at a temperature of from 1,200 to 1,600° C. over a period of from 2 to 40 hours in a nitrogen atmosphere or a reducing atmosphere comprising hydrogen and nitrogen. In a case wherein firing is carried out in a number of times, each firing operation may be carried out in a reducing atmosphere. This fired product may be dispersed, washed with water, dried and sieved to obtain a green-emitting Mn-activated alkaline earth aluminate phosphor of the present invention.

The Mn-activated alkaline earth aluminate phosphor prepared by the above method, may be coated in cells of PDP by e.g. thick film-printing, followed by baking and then a rare gas is sealed in at a level of a few hundreds Torr, as in a conventional practice, to obtain a vacuum ultraviolet excitation type light-emitting element of the present invention.

BEST MODE FOR CARRYING OUT THE INVENTION

EXAMPLE 1

Figure 1:
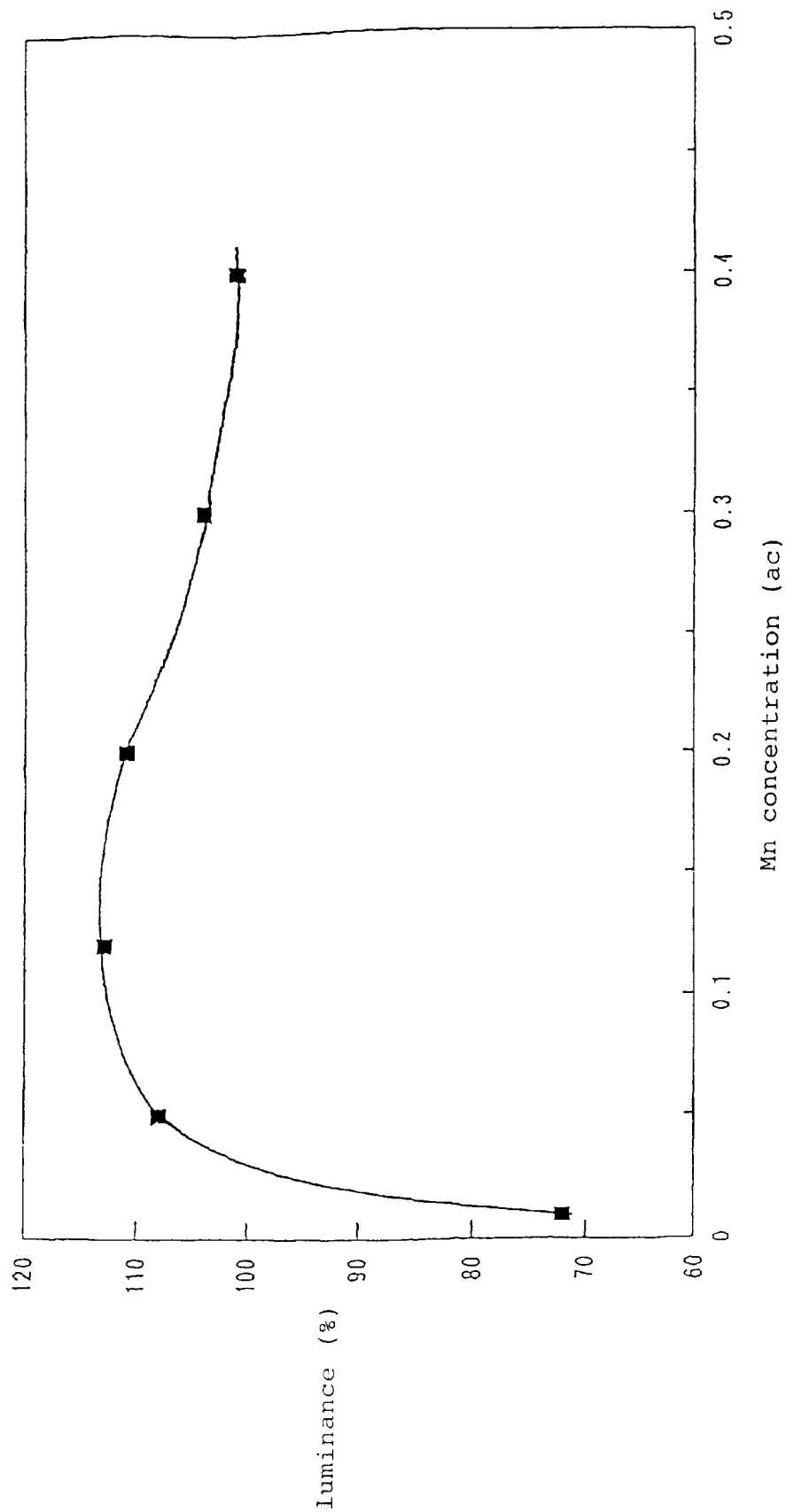
FIG. 1 is a graph showing the inter-relation between the concentration (a×c) of Mn as the activator and the emission luminance under excitation with vacuum ultraviolet rays, with respect to the aluminate phosphor of the present invention.

| | |
|---|---|
| $BaCO_3$ | 0.829 mol |
| $Al_2O_3$ | 5.95 mol |
| $MnCO_3$ | 0.05 mol |
| $AlF_3$ | 0.01 mol |

The above raw materials were mixed and packed into a crucible, and a crucible containing graphite blocks, was placed on the raw materials. A cover was put thereon, followed by firing in a nitrogen atmosphere containing steam at the maximum temperature of 1450° C. over a period of 28 hours inclusive of the temperature raising and lowering times. Then, the fired powder was subjected to dispersion, washing, drying and sieving to obtain a bivalent Mn-activated green-emitting barium aluminate phosphor represented by the compositional formula of $0.95(0.82BaO \cdot 6Al_2O_3) \cdot 0.05(BaMnAl_{10}O_{17})$.

The obtained phosphor was irradiated with vacuum ultraviolet rays of 147 nm by means of a demountable simple vacuum ultraviolet ray source to measure the emission luminance and the emitted color. The relative emission luminance of this phosphor was 108%, when the luminance of a conventional $BaAl_{12}O_{19}$:Mn phosphor (Comparative Example 1) was taken as 100%. Further, the emitted color was represented by the chromaticity points (x, y) in the CIE chromaticity coordinates, whereby x=0.169, and y=0.744.

COMPARATIVE EXAMPLE 1

| | |
|---|---|
| $BaCO_3$ | 1.0 mol |
| $Al_2O_3$ | 6.0 mol |
| $MnCO_3$ | 0.12 mol |
| $AlF_3$ | 0.01 mol |

The above raw materials were treated in the same manner as in Example 1 to obtain a $BaAl_{12}O_{19}$:Mn phosphor.

The emission luminance and the emitted color of the obtained phosphor were measured in the same manner as in Example 1, and this emission luminance was taken as 100%. The emitted color was such that x=0.179, and y=0.732.

EXAMPLES 2 TO 4 AND COMPARATIVE EXAMPLES 2 AND 3

The treatment was carried out in the same manner as in Example 1 except that, as the phosphor raw materials, the raw material compounds as identified in Table 1 were used in the amounts (represented by mol) as identified in Table 1, to obtain phosphors of Examples 2 to 4 having the compositions as identified in Table 2. The relative emission luminances and the emitted colors of the obtained phosphors are as shown in Table 2.

TABLE 1

| | $BaCO_3$ (mol) | $MgCO_3$ (mol) | $Al_2O_3$ (mol) | $MnO_2$ (mol) | $AlF_3$ (mol) |
|---|---|---|---|---|---|
| Example 1 | 0.829 | 0 | 5.95 | 0.05 | 0.01 |
| Example 2 | 0.842 | 0 | 5.88 | 0.12 | 0.01 |
| Example 3 | 0.856 | 0 | 5.80 | 0.20 | 0.01 |
| Example 4 | 0.874 | 0 | 5.70 | 0.30 | 0.01 |
| Comparative Example 1 | 1.000 | 0 | 6.00 | 0.12 | 0.01 |
| Comparative Example 2 | 0.892 | 0 | 5.60 | 0.40 | 0.01 |
| Comparative Example 3 | 0.822 | 0 | 5.99 | 0.01 | 0.01 |

TABLE 2

| | Compositional formula (1 − a) (bBaO.6Al$_2$O$_3$) a(BaMg$_{1-c}$Mn$_c$Al$_{10}$O$_{17}$) | | | | Emission characteristics | | |
|---|---|---|---|---|---|---|---|
| | value a | value b | value c | value ac | value x | value y | luminance (%) |
| Example 1 | 0.050 | 0.820 | 1.00 | 0.05 | 0.169 | 0.744 | 108 |
| Example 2 | 0.120 | 0.820 | 1.00 | 0.12 | 0.173 | 0.746 | 113 |
| Example 3 | 0.200 | 0.820 | 1.00 | 0.20 | 0.135 | 0.733 | 111 |
| Example 4 | 0.300 | 0.820 | 1.00 | 0.30 | 0.194 | 0.734 | 104 |
| Comparative Example 1 | 0.118 | 0.975 | 1.00 | 0.12 | 0.179 | 0.732 | 100 |
| Comparative Example 2 | 0.400 | 0.820 | 1.00 | 0.40 | 0.199 | 0.731 | 101 |
| Comparative Example 3 | 0.010 | 0.820 | 1.00 | 0.01 | 0.168 | 0.731 | 72 |

It is apparent from Table 2 that the phosphors of Examples 2 to 4 and Comparative Examples 2 and 3 are such that in the compositions of the respective phosphors, value b was 0.82, value c was 1.00, element M was Ba, and the Mn concentration (a×c) was changed by changing the value a.

FIG. 1 is a graph wherein the relative emission luminances of the phosphors of Examples 2 to 4 and Comparative Examples 2 and 3 were plotted against the Mn concentration (a×c) of the phosphors. As is evident also from this Figure, the luminance is high when the Mn concentration (a×c) is within a range of 0.05≦(a×c)≦0.3.

EXAMPLES 5 to 15

The treatment was carried out in the same manner as in Example 1 except that as the phosphor raw materials, the raw material compounds as identified in Table 3 were used in the amounts (represented by mol) as identified in Table 3, to obtain phosphors of Examples 5 to 17 having compositions as identified in Table 4. The relative emission luminances and the emitted colors of the obtained phosphors are as shown in Table 4.

TABLE 3

| | BaCO$_3$ (mol) | MgCO$_3$ (mol) | Al$_2$O$_3$ (mol) | MnO$_2$ (mol) | AlF$_3$ (mol) |
|---|---|---|---|---|---|
| Example 2 | 0.842 | 0 | 5.880 | 0.12 | 0.01 |
| Example 5 | 0.844 | 0.013 | 5.867 | 0.12 | 0.01 |
| Example 6 | 0.847 | 0.030 | 5.850 | 0.20 | 0.01 |
| Example 7 | 0.856 | 0.080 | 5.800 | 0.12 | 0.01 |
| Example 8 | 0.874 | 0.180 | 5.700 | 0.12 | 0.01 |
| Example 9 | 0.964 | 0.680 | 5.200 | 0.12 | 0.01 |
| Example 10 | 0.974 | 0.737 | 5.143 | 0.12 | 0.01 |
| Example 11 | 0.980 | 0.769 | 5.111 | 0.12 | 0.01 |
| Example 12 | 0.986 | 0.803 | 5.077 | 0.12 | 0.01 |
| Example 13 | 0.989 | 0.821 | 5.059 | 0.12 | 0.01 |
| Example 14 | 0.993 | 0.840 | 5.040 | 0.12 | 0.01 |
| Example 15 | 0.996 | 0.860 | 5.020 | 0.12 | 0.01 |

TABLE 4

| | Compositional formula (1 − a) (bBaO.6Al$_2$O$_3$) a(BaMg$_{1-c}$Mn$_c$Al$_{10}$O$_{17}$) | | | | Emission characteristics | | |
|---|---|---|---|---|---|---|---|
| | value a | value b | value c | value ac | value x | value y | luminance (%) |
| Example 2 | 0.120 | 0.820 | 1.000 | 0.12 | 0.169 | 0.746 | 108 |
| Example 5 | 0.133 | 0.820 | 0.900 | 0.12 | 0.174 | 0.745 | 114 |
| Example 6 | 0.150 | 0.820 | 0.800 | 0.12 | 0.174 | 0.746 | 111 |
| Example 7 | 0.200 | 0.820 | 0.600 | 0.12 | 0.175 | 0.746 | 114 |
| Example 8 | 0.300 | 0.820 | 0.400 | 0.12 | 0.175 | 0.745 | 110 |
| Example 9 | 0.800 | 0.820 | 0.150 | 0.12 | 0.155 | 0.754 | 108 |
| Example 10 | 0.857 | 0.820 | 0.140 | 0.12 | 0.153 | 0.753 | 113 |
| Example 11 | 0.889 | 0.820 | 0.135 | 0.12 | 0.150 | 0.754 | 108 |
| Example 12 | 0.923 | 0.820 | 0.130 | 0.12 | 0.146 | 0.756 | 111 |
| Example 13 | 0.941 | 0.820 | 0.128 | 0.12 | 0.145 | 0.756 | 108 |
| Example 14 | 0.960 | 0.820 | 0.125 | 0.12 | 0.143 | 0.757 | 108 |
| Example 15 | 0.980 | 0.820 | 0.123 | 0.12 | 0.141 | 0.759 | 112 |

It is apparent from Table 4 that the phosphors of Examples 5 to 15 are such that element M was Ba in all cases, and high luminances were obtained in the entire range of from 0.12 to 1.0 (value c at that time changes within a range of from 1.0 to 0.12) wherein the proportion (value a) of the (BaMg$_{1-c}$Mn$_c$Al$_{10}$O$_{17}$) component in each phosphor composition, can be changed when the value b was fixed at 0.82, and the Mn concentration (a×c) was fixed at 0.12.

EXAMPLES 16 TO 19

The treatment was carried out in the same manner as in Example 1 except that as the phosphor raw materials, the raw material compounds as identified in Table 5 were used in the amounts (represented by mol) as identified in Table 5, to obtain phosphors of Examples 16 to 19 having compositions as identified in Table 6. The relative emission luminances and the emitted colors of the obtained phosphors are shown in Table 6 together with Comparative Example 1.

TABLE 5

|  | BaCO$_3$ (mol) | MgCO$_3$ (mol) | Al$_2$O$_3$ (mol) | MnO$_2$ (mol) | AlF$_3$ (mol) |
| --- | --- | --- | --- | --- | --- |
| Example 16 | 0.700 | — | 6.00 | 0.12 | 0.01 |
| Example 17 | 0.740 | — | 6.00 | 0.12 | 0.01 |
| Example 18 | 0.800 | — | 6.00 | 0.12 | 0.01 |
| Example 19 | 0.877 | — | 5.88 | 0.12 | 0.01 |
| Comparative Example 1 | 1.000 | — | 6.00 | 0.12 | 0.01 |

TABLE 6

|  | Compositional formula $(1-a)(bBaO\cdot 6Al_2O_3)\ a(BaMg_{1-c}Mn_cAl_{10}O_{17})$ | | | | Emission characteristics | | |
| --- | --- | --- | --- | --- | --- | --- | --- |
|  | value a | value b | value c | value ac | value x | value y | luminance (%) |
| Example 16 | 0.118 | 0.644 | 1.000 | 0.118 | 0.178 | 0.742 | 112 |
| Example 17 | 0.118 | 0.689 | 1.000 | 0.118 | 0.177 | 0.742 | 112 |
| Example 18 | 0.118 | 0.756 | 1.000 | 0.118 | 0.176 | 0.743 | 113 |
| Example 19 | 1.200 | 0.860 | 1.000 | 0.120 | 0.176 | 0.743 | 113 |
| Comparative Example 1 | 0.118 | 0.978 | 1.000 | 0.118 | 0.179 | 0.732 | 100 |

It is apparent from Table 6 that the phosphors of Examples 16 to 19 are such that element M was Ba in all cases, and value b was varied whereby, as compared with the phosphor in Comparative Example 1, particularly high emission luminance was obtained within a range of $0.64 \leq b \leq 0.86$. The phosphors of Examples 16 and 17 were confirmed to contain Al$_2$O$_3$ by X-ray refraction.

EXAMPLES 20 TO 23

The treatment was carried out in the same manner as in Example 1 except that as the phosphor raw materials, the raw material compounds as identified in Table 7 were used in the amounts (represented by mol) as identified in Table 7, to obtain phosphors of Examples 20 to 23 having compositions as identified in Table 8. The relative emission luminances and the emitted colors of the obtained phosphors are shown in Table 8. The phosphors of Examples 20 to 23 are such that value c was not 1, and the Mn concentration (a×c) was changed. As is evident from Table 8, these phosphors exhibit high emission luminances as compared with Comparative Examples 1 (conventional phosphor).

TABLE 7

|  | BaCO$_3$ (mol) | MgCO$_3$ (mol) | Al$_2$O$_3$ (mol) | MnO$_2$ (mol) | AlF$_3$ (mol) |
| --- | --- | --- | --- | --- | --- |
| Example 20 | 0.986 | 0.853 | 5.077 | 0.07 | 0.01 |
| Example 21 | 0.986 | 0.753 | 5.077 | 0.17 | 0.01 |
| Example 22 | 0.986 | 0.703 | 5.077 | 0.22 | 0.01 |
| Example 23 | 0.986 | 0.653 | 5.077 | 0.27 | 0.01 |

TABLE 8

|  | Compositional formula $(1-a)(bBaO\cdot 6Al_2O_3)\ a(BaMg_{1-c}Mn_cAl_{10}O_{17})$ | | | | Emission characteristics | | |
| --- | --- | --- | --- | --- | --- | --- | --- |
|  | value a | value b | value c | value ac | value x | value y | luminance (%) |
| Example 20 | 0.923 | 0.820 | 0.076 | 0.07 | 0.145 | 0.755 | 107 |
| Example 21 | 0.923 | 0.820 | 0.184 | 0.17 | 0.150 | 0.755 | 112 |
| Example 22 | 0.923 | 0.820 | 0.238 | 0.22 | 0.150 | 0.755 | 109 |
| Example 23 | 0.923 | 0.820 | 0.293 | 0.27 | 0.152 | 0.754 | 105 |

EXAMPLES 24 to 26

The treatment was carried out in the same manner as in Example 1 except that as the phosphor raw materials, the raw material compounds as identified in Table 9 were used in the amounts (represented by mol) as identified in Table 9, to obtain phosphors of Examples 24 to 26 having compositions as identified in Table 10. The relative emission luminances and the emitted colors of the obtained phosphors are shown in Table 10.

The phosphors of Examples 24 to 26 are such that value c was 1, and they contained no Mg, and part of Ba incorporated as element M was substituted by Sr. As is evident from Table 10, these phosphors also exhibit high emission luminances as compared with Comparative Example 1 (conventional phosphor).

TABLE 9

| | BaCO$_3$ (mol) | SrCO$_3$ (mol) | Al$_2$O$_3$ (mol) | MnO$_2$ (mol) | AlF$_3$ (mol) |
|---|---|---|---|---|---|
| Example 24 | 0.782 | 0.060 | 5.880 | 0.12 | 0.06 |
| Example 25 | 0.722 | 0.120 | 5.880 | 0.12 | 0.01 |
| Example 26 | 0.662 | 0.180 | 5.880 | 0.12 | 0.01 |

TABLE 10

| | Compositional formula (1 − a) (bMO·6Al$_2$O$_3$) a(MMg$_{1-c}$Mn$_c$Al$_{10}$O$_{17}$) | | | | | Emission characteristics | | |
|---|---|---|---|---|---|---|---|---|
| | value a | value b | value c | value ac | Sr/Sr + Ba | value x | value y | luminance (%) |
| Example 24 | 0.120 | 0.820 | 1.000 | 0.120 | 0.071 | 0.174 | 0.746 | 116 |
| Example 25 | 0.120 | 0.320 | 1.000 | 0.120 | 0.143 | 0.177 | 0.744 | 113 |
| Example 26 | 0.120 | 0.320 | 1.000 | 0.120 | 0.214 | 0.179 | 0.742 | 112 |

EXAMPLES 27 TO 30

The treatment was carried out in the same manner as in Example 1 except that as the phosphor raw materials, the raw material compounds as identified in Table 11 were used in the amounts (represented by mol) as identified in Table 11, to obtain phosphors of Examples 27 to 30 having compositions as identified in Table 12. The relative emission luminances and the emitted colors of the obtained phosphors are shown in Table 12.

The phosphors of Examples 27 to 30 are such that the Mn concentration (a×c) was fixed at 0.12, and part of Ba incorporated as element M was substituted by Sr. As is evident from Table 12, also these phosphors exhibit high emission luminances as compared with the Comparative Example 1 (conventional phosphor).

TABLE 11

| | BaCO$_3$ (mol) | MgCO$_3$ (mol) | SrCO$_3$ (mol) | Al$_2$O$_3$ (mol) | MnO$_2$ (mol) | AlF$_3$ (mol) |
|---|---|---|---|---|---|---|
| Ex. 27 | 0.736 | 0.803 | 0.250 | 5.077 | 0.120 | 0.01 |
| Ex. 28 | 0.486 | 0.803 | 0.500 | 5.077 | 0.120 | 0.01 |
| Ex. 29 | 0 | 0.803 | 0.986 | 5.077 | 0.120 | 0.01 |
| Ex. 30 | 0.236 | 0.803 | 0.750 | 5.077 | 0.120 | 0.01 |

TABLE 12

| | Compositional formula (1 − a) (bMO·6Al$_2$O$_3$) a(MMg$_{1-c}$Mn$_c$Al$_{10}$O$_{17}$) | | | | | Emission characteristics | | |
|---|---|---|---|---|---|---|---|---|
| | value a | value b | value c | value ac | Sr/Sr + Ba | value x | value y | luminance (%) |
| Example 27 | 0.923 | 0.820 | 1.000 | 0.120 | 0.254 | 0.150 | 0.757 | 116 |
| Example 28 | 0.923 | 0.820 | 1.000 | 0.120 | 0.507 | 0.152 | 0.758 | 117 |
| Example 29 | 0.923 | 0.820 | 1.000 | 0.120 | 1.000 | 0.150 | 0.765 | 112 |
| Example 30 | 0.923 | 0.820 | 1.000 | 0.120 | 0.761 | 0.153 | 0.759 | 118 |

INDUSTRIAL APPLICABILITY

By adopting the above described construction, the present invention is capable of presenting a phosphor which emits a green color with high luminance under excitation with vacuum ultraviolet rays, and capable of presenting a vacuum ultraviolet ray excitation type light-emitting element with high luminance.

We claim:

1. A manganese-activated aluminate phosphor represented by the following compositional formula:

$$(1-a)(bMO \cdot 6Al_2O_3) \cdot a(MMg_{1-c}Mn_cAl_{10}O_{17})$$

wherein M is at least one member of Ba and Sr, and a, b and c are numbers satisfying the conditions of $0.05 \leq a \leq 1.0$, $0.64 \leq b \leq 0.86$, $0.05 \leq c \leq 1.0$ and $0.05 \leq a \times c \leq 0.3$, respectively.

2. A vacuum ultraviolet ray excitation type light-emitting element characterized in that it has the manganese-activated aluminate phosphor as defined in claim 1, as a fluorescent layer.

3. A process for producing a manganese-activated aluminate phosphor characterized by mixing phosphor material compounds comprising an oxide of element M or a compound of element M which is readily convertible at a high temperature to an oxide of element M, Al$_2$O$_3$ or a compound of Al which is readily convertible at a high temperature to an oxide of element Al, MgO or a compound of element Mg which is readily convertible at a high temperature to an oxide of element Mg, and MnO$_2$ or a compound of element Mg which is readily convertible at a high temperature to an oxide of Mn, stoichiometrically in the proportions represented by the following compositional formula, then adding to the mixture a fluoride as a flux in an amount of 0.1 mol per mol of the phosphor at the maximum, and firing the mixture at a temperature of from 1,200 to 1,600° C.:

$$(1-a)(bMO \cdot 6Al_2O_3) \cdot a(MMg_{1-c}Mn_cAl_{10}O_{17})$$

wherein M is at least one member of Ba and Sr, and a, b and c are numbers satisfying the conditions of $0.05 \leq a \leq 1.0$, $0.64 \leq b \leq 0.86$, $0.05 \leq c \leq 1.0$ and $0.05 \leq a \times c \leq 0.3$, respectively.

* * * * *

UNITED STATES PATENT AND TRADEMARK OFFICE
CERTIFICATE OF CORRECTION

PATENT NO. : 5,989,455

DATED : November 23, 1999

INVENTOR(S): Takayuki HISAMUNE et al.

It is certified that an error appears in the above-identified patent and that said Letters Patent is hereby corrected as shown below:

On the title page, item [30], has been omitted. It should read as follows:

--[30] Foreign Application Priority Data

Jun. 13, 1996 [JP] Japan............8-152343--

Signed and Sealed this

Thirtieth Day of January, 2001

Attest:

Q. TODD DICKINSON

*Attesting Officer*   *Director of Patents and Trademarks*